No. 12,825.

G. KRON.

REISSUED JULY 7, 1908.

MECHANICAL HAMMERING DEVICE FOR USE IN THE MANUFACTURE OF BOOTS AND SHOES OR THE LIKE.

APPLICATION FILED JULY 11, 1905.

WITNESSES.

Edith C. Holbrook

Arthur L. Russell

INVENTOR.

Georg Kron

By his Attorney,

Nelson W. Morrand

UNITED STATES PATENT OFFICE.

GEORG KRON, OF MALMÖ, SWEDEN, ASSIGNOR TO UNITED SHOE MACHINERY COMPANY, OF PATERSON, NEW JERSEY, A CORPORATION OF NEW JERSEY.

MECHANICAL HAMMERING DEVICE FOR USE IN THE MANUFACTURE OF BOOTS AND SHOES OR THE LIKE.

No. 12,825. Specification of Reissued Letters Patent. Reissued July 7, 1908.

Original No. 733,974, dated July 21, 1903, Serial No. 75,835. Application for reissue filed July 11, 1905. Serial No. 269,271.

*To all whom it may concern:*

Be it known that I, GEORG KRON, a subject of the Emperor of Germany, residing at Malmö, Sweden, have invented an Improved Mechanical Hammering Device for Use in the Manufacture of Boots, Shoes, or the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object a mechanically-actuated hammer for use in shoe-making and which is especially suitable for beating the upper before the operation of pegging or otherwise securing the outersole has taken place in order that it may fit perfectly smoothly on the insole of the shoe or boot. In this operation it is necessary for the hammer to strike from the edge of the sole toward the center of the same, so that the shape of the shoe may not suffer, as would be the case were the striking to take place vertically. In order to obtain this slanting blow, the striking mechanism is guided in a curved course by means of a suitable link-gear, the lower oblique part of this course being utilized as the striking-point. The shoe is held with the marginal portion of its bottom in position to be engaged by the hammer and may be moved about to present different parts of the shoe bottom to the action of the hammer, the weight of the last affording sufficient resistance to the comparatively light and rapidly-working hammer or striker, so that a firm support of the last is not necessary.

Figure 1:
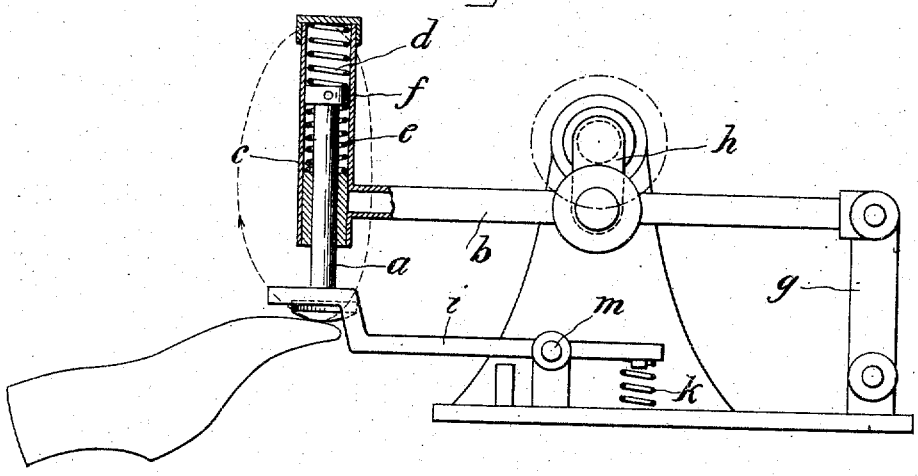
Figure 2:
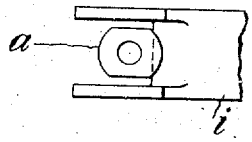

Referring to the drawings, in which like parts are similarly designated, Figure 1 shows one form of construction embodying the invention; and Fig. 2 the prongs of the contact-piece *i*, with the striking mechanism between them.

The striking mechanism *a* is mounted in a guide *c*, closed at the upper end and arranged on the free end of the striker-arm *b*, and is held by means of two springs *d* and *e*, which bear against a piston *f* on the striker, and thus afford an elastic support to the same. The piston or collar *f* may also be constructed so as to form an air-piston in order to increase the spring action. The other end of the striker-arm is guided in an arc by means of a link *g*, while a point in the center of the striker-arm is carried around in a circle by means of a crank *h*. The striker-tool thus describes approximately the curve which is shown in dotted lines in Fig. 1.

In order that the striker may engage the upper on the bottom face of the sole at the same distance from the edge of the shoe, a forked contact-piece *i* is pivoted on a bolt *m*, along which contact-piece the edge of the shoe is moved. The regulation of the strength of stroke takes place by the last being pressed more or less strongly against the prongs of the contact-piece *i*, as the latter, whose forward end is pressed downward by the spring *k*, yields when the last is pressed upward and allows the last to approach the striking-point, and consequently increases the striking action.

Having thus described my said invention, what I claim as new therein, and desire to secure by Letters Patent, is:—

1. In a machine of the class described, the combination with an arm, a hammer carried thereby, a crank connected to the arm and means to cause said hammer to travel in substantially an elliptical path; of a forked lever, the fork thereof embracing the hammer, and means for causing a downward pressure on the forked end of the lever, substantially as set forth.

2. In a machine of the class described, the combination with an arm, a guide carried on one end thereof, a hammer, spring and air cushioned in the guide, a crank connected to the arm intermediate its ends, and means pivotally connected to the other end of the arm to cause the hammer to travel in a substantially elliptical path; of a pivoted lever having a fork at one end and a spring pressing against the other end to cause a downward pressure on the fork, substantially as set forth.

3. In a machine of the class described, the combination with an arm, a guide closed at one end and carried at one end of said arm, a piston in the guide, a hammer secured to and a spring on each side of the piston to spring and air cushion the piston and hammer, a link pivoted at one end to a fixed element and at the other end to the other end of said arm; of a lever pivoted intermediate its ends, a fork on one end of the lever surrounding the hammer, and a spring acting against the end of the lever to cause a downward pressure on the fork, substantially as set forth.

4. In a machine constructed and arranged to deliver a plurality of blows to substantially the same portion of the upper on the bottom of a shoe, the combination with a guide for the shoe, of a hammer and means for actuating the hammer to cause it to move from a position outside of the shoe bottom and to strike from the edge of the shoe bottom inwardly.

5. In a machine for beating the upper on the bottom of a shoe, the combination with a guide for the shoe, of a hammer having provision for yielding upwardly and means for actuating the hammer downwardly in a path inclined to the shoe bottom and inwardly over the shoe bottom, said machine being constructed and arranged to permit the shoe to be moved to present different portions thereof to the operation of the hammer.

6. In a machine for beating the upper on the bottom of a shoe, the combination with a guide for the shoe, of a beating device and means independent of the work for actuating the beating device in a curved path to deliver oblique blows directed downwardly toward the shoe bottom and inwardly from the edge of the shoe bottom.

7. In a machine for beating the upper on the bottom of a shoe, the combination with a hammer and means for yieldingly actuating the hammer to deliver oblique blows to the shoe, of guiding means for engaging the shoe bottom arranged to yield to permit the shoe to be presented at different altitudes with relation to the path of the hammer for varying the effect of the blows on the shoe upper, said machine being constructed and arranged to permit the shoe to be moved to present different portions thereof to the operation of the hammer.

8. In a machine for beating the upper on the bottom of a shoe, the combination with a hammer, of means for actuating the hammer in an approximately elliptical path, said machine having provision for permitting the shoe to be presented in position to be engaged by the hammer in the lower oblique part of said elliptical path.

9. In a machine for beating the upper on the bottom of a shoe, the combination with a beating device, of means for actuating said beating device downwardly toward the shoe bottom and inwardly away from the edge of the shoe bottom and then upwardly away from the shoe in a different path.

10. In a machine for beating the upper on the bottom of a shoe, the combination with a hammer, of means for actuating said hammer in an oblique path downwardly toward the shoe bottom and inwardly away from the edge of the shoe bottom and then in an oblique path inwardly and upwardly away from the shoe bottom.

11. In a machine for beating the upper on the bottom of a shoe, the combination with a hammering device, of operating means therefor comprising means by which the hammering device is yieldingly actuated from a position outside the shoe bottom downwardly toward the shoe and is actuated over the shoe bottom while in contact therewith and then raised from the work.

12. In a machine for beating the upper on the bottom of a shoe, a hammer and mechanism for actuating the hammer to deliver blows directed obliquely downwardly toward the shoe bottom and inwardly from the edge of the shoe bottom, said mechanism having provision for allowing the hammer to yield upwardly but not outwardly and for lifting the hammer out of contact with the work after each blow in a different path.

13. In a machine for beating the upper on the bottom of a shoe, the combination with a beating device and means for actuating it over the shoe from the edge thereof downwardly and inwardly in contact with the upper on the shoe bottom, of means, comprising shoe engaging members located at opposite sides of the path of the beating device, for resting the shoe.

14. In a machine for beating the upper on the bottom of a shoe, the combination with a beating device and means for actuating it downwardly and inwardly over the shoe from the edge thereof in contact with the upper on the shoe bottom, of means constructed and arranged to extend over the shoe bottom adjacent to the path of the beating device, and shoe guiding members located at opposite sides of the path of the beating device in position for engagement with the sides of the shoe at and adjacent to its edge.

15. A machine for use in manufacturing shoes having a beating device and means for actuating it downwardly toward the shoe and inwardly from the edge of the shoe bottom, and means for engaging the shoe bottom at opposite sides of the path of movement of the beating device.

16. A machine for use in manufacturing shoes having means comprising a forked member adapted to engage the upper on the bottom of a shoe, means adapted to engage the upper between the forks of said members, and mechanism for actuating said engaging means downwardly and inwardly to work the upper away from the edge of the shoe bottom.

17. A machine for use in beating the upper on the bottom of a shoe downwardly toward the last bottom and inwardly from the edge of the last, having shoe engaging means comprising a forked member constructed and arranged to engage the upper on the bottom of the shoe and presenting a face for resting the side of the shoe, said machine having provision for permitting vertical yielding movement of said forked member.

18. In a machine for beating the upper on the bottom of a shoe, the combination with a beater and automatic mechanism for rapidly actuating said beater downwardly toward the shoe bottom and inwardly from the edge of the shoe, said actuating mechanism being constructed and arranged to maintain the beater in sliding contact with the upper in its inward movement from the edge of the shoe and out of contact with the upper during its backward movement.

19. In a machine for beating the upper on the bottom of a shoe, a beater arranged to move from outside the shoe bottom inwardly over the shoe and automatically operated mechanism constructed and arranged to effect in quick succession a series of separate and distinct beating movements in rubbing contact with the upper from the edge of the shoe inwardly, said machine having provision for holding the beater out of contact with the upper during its reverse movement.

20. In a machine for beating the upper on the bottom of a shoe, a beating device, automatically operated mechanism for actuating said device continuously in an orbital path, and means for positioning the shoe to receive the action of the beating device in the lower outward portion of its stroke.

In testimony whereof I have signed my name to the specification in the presence of two subscribing witnesses.

GEORG KRON.

Witnesses:
RAYMOND R. FRAZIER,
DAVID HEAUGER.